United States Patent Office 3,635,866
Patented Jan. 18, 1972

3,635,866
FLAME-RETARDANT POLYBUTENE-1 COMPOSITIONS
Francis M. Seger, Edison, N.J., assignor to Mobil Oil Corporation
No Drawing. Filed Dec. 24, 1969, Ser. No. 888,061
Int. Cl. C08f 45/52, 45/60; C09k 3/28
U.S. Cl. 260—28.5 R         4 Claims

ABSTRACT OF THE DISCLOSURE

Flame-retardant polybutene-1 compositions contain three additives; antimony trioxide, ammonium fluoborate, and another halogen-containing compound having 60–90 percent halogen. These compositions are characterized by having a total flame-retardant additive content of 15 weight percent or less and by having a burning time of less than two seconds before self-extinguishment.

BACKGROUND OF THE INVENTION

Field of the invention

This invention is directed to polybutene-1 compositions that are self-extinguishing within two seconds.

Description of the prior art

Flame-retardant polyethylene compositions have been proposed containing a combination of antimony trioxide and a chlorinated hydrocarbon (U.S. 2,480,298) or a combination of antimony trioxide and ammonium fluoborate (U.S. 3,239,482) have been proposed. Such compositions are disadvantageous, however, because they do not show burn times less than two seconds without using additive amounts in the order of 30 percent. It will be appreciated that large amounts of additive are not only expensive, but tend to degrade the physical properties of the polymer.

SUMMARY OF THE INVENTION

This invention provides a flame-retardant polybutene-1 composition containing an additive combination of 2–7 weight percent antimony trioxide, 4–8 weight percent ammonium fluoborate, and 1–4 weight percent of a halogenated compound containing 60 to 90 percent chlorine or bromine, the total amount of the additive combination being not more than 15 weight percent of the total weight of polybutene-1 and the additive, whereby said polybutene-1 composition has a burn time less than two seconds.

DESCRIPTION OF SPECIFIC EMBODIMENTS

In order to achieve low burn times and low additive concentrations, it is essential that polybutene-1 contain a combination of three additives.

One additive is antimony trioxide in concentration of 2–7 weight percent.

The second is ammonium fluoborate in concentrations of 4–8 weight percent.

The third additive is another halogenated compound containing 60 to 90 percent chlorine or bromine, in concentrations of 1–4 weight percent. This additive can be a halogenated hydrocarbon, such as chlorinated wax, hexachloroethane, and hexabromoethane. Other halogenated compounds can also be used. Tris-(2,3-dibromopropyl) phosphate is particularly satisfactory in this regard.

The total concentration of the combination of three additives, however, does not exceed 15 weight percent of the entire composition. The additive combination can be incorporated into the butene-1 homopolymer or butene-1-ethylene copolymer by any of the methods well-known in the art, such as Banbury mixer, differential speed mill, or extruder mixing.

The butene-1 homopolymer or butene-1-ethylene copolymers that are made flame-retardant in accordance with this invention are tactic homopolymers or copolymers of butene-1 with up to 20 mole percent ethylene. They are prepared by using a Ziegler-Natta catalyst system, such as titanium trichloride and diethylaluminum chloride. A preferred copolymer contains about 10 mole percent ethylene. A particularly feasible method for preparing them in liquid butene-1 solution is described in U.S. Pat. No. 3,362,940.

The flame-retardant characteristics of copolymer compositions were determined by using the techniques of ASTM Test D–635. The flame was held to the test specimen for the prescribed time and then the time that the specimen continued to burn before self-extinguishment was measured in seconds.

The following examples demonstrate the additive combinations of this invention, and compares them with prior art combinations.

EXAMPLES 1–7

A series of blends of polybutene-1 was prepared containing antimony trioxide, chlorinated wax (70% Cl), and a third halogenated compound. Pertinent data, tensile test results (D–638), and flame retardant characteristics are set forth in Table I.

EXAMPLES 8–12

For comparison purposes, another series of blends of polybutene-1 was prepared containing prior art additive combinations. Pertinent data and flame retardant characteristics are set forth in Table II.

TABLE I

| Example Number | 1 | 2 | 3 | 4 | 5 | 6 | 7 |
|---|---|---|---|---|---|---|---|
| Composition, wt. percent: | | | | | | | |
| Polybutene-1 | 85 | 87 | 88 | 88 | 90 | 86 | 88 |
| $Sb_2O_3$ | 7 | 3 | 3 | 3 | 3 | 3 | 3 |
| $NH_4BF_4$ | 4 | 8 | 6 | 8 | 6 | 8 | 6 |
| Chlorowax* | 4 | 2 | 3 | | | | |
| $C_2Cl_6$ | | | | | | 3 | 3 |
| $T_{23}P^{**}$ | | | | 1 | 1 | | |
| Burn time, sec | 0.8 | 0.8 | 0.5 | 0.7 | 0.8 | 0.8 | 0.9 |
| Tensile (ASTM D–638–68): | | | | | | | |
| Yield, p.s.i., ×$10_3$ | 0.95 | 1.24 | 1.07 | 2.12 | 2.21 | 2.11 | 2.13 |
| Break, p.s.i., ×$10_3$ | 3.62 | 3.03 | 3.64 | 2.97 | 3.23 | 3.21 | 3.45 |
| Elongation, percent | 294 | 238 | 276 | 210 | 242 | 248 | 268 |
| Modulus, p.s.i., ×$10^4$ | 2.67 | 3.09 | 2.97 | 4.33 | 4.41 | 4.30 | 4.20 |

\* Chlorinated paraffin wax (70% chlorine).
\*\* Tris(2,3-dibromopropyl)phosphate.

TABLE II

| Example Number | 8 | 9 | 10 | 11 | 12 |
|---|---|---|---|---|---|
| Polybutene-1 | 70 | 65 | 70 | 80 | 89 |
| $Sb_2O_3$ | 15 | 10 | 15 | 10 | 3 |
| Chlorowax* | 15 | 25 | | | |
| $NH_4BF_4$ | | | 15 | 10 | 8 |
| Burn time, sec | 220 | 93 | 1.5 | 5.2 | 170 |

\* Chlorinated paraffin wax (70% chlorine).

From the data set forth in Table I, it will be apparent that the three component additive combinations of this invention effects a high degree of flame retardancy at low additive levels. The physical (tensile) properties are highly satisfactory.

On the other hand, from the data set forth in Table II, it will be apparent that even at high additive concentrations of antimony oxide and chlorowax, the burn times are long (Exs. 8 and 9). In the case of antimony oxide and $NH_4BF_4$, short burn times can be achieved only at high additive concentrations (Ex. 10). At lower concentrations, burn times increase.

It will be noted that Example 12 defines a low concentration combination but has a high burn time (170 sec.). Comparing this example with Examples 2, 4 and 6 (the same formulation with a second halogen-containing compound added), the surprising result of adding another halogen-containing compound is at once apparent.

Although the present invention has been described with preferred embodiments, it is to be understood that modifications and variations may be restored to, without departing from the spirit and scope of this invention, as those skilled in the art will readily understand. Such variations and modifications are considered to be within the purview and scope of the appended claims.

What is claimed is:

1. A flame-retardant polybutene-1 composition containing an additive combination of 2–7 weight percent antimony trioxide, 4–8 weight percent ammonium fluoborate, and 1–4 weight percent of a halogenated compound containing 60 to 90 percent chlorine or bromine, the total amount of the additive combination being not more than 15 weight percent of the total weight of polybutene-1 and the additive, whereby said polybutene-1 composition has a burn time less than two seconds.

2. The composition of claim 1, wherein said halogenated compound is chlorinated paraffin wax containing 70 percent chlorine.

3. The composition of claim 1, wherein said halogenated compound is tetrachloroethane.

4. The composition of claim 1, wherein said halogenated compound is tris(2,3-dibromopropyl)phosphate.

References Cited

UNITED STATES PATENTS

| | | | |
|---|---|---|---|
| 3,121,067 | 2/1964 | Nelson | 260—41 |
| 3,124,557 | 3/1964 | Eichhorn | 260—45.7 |
| 3,287,312 | 11/1966 | Ling | 260—41 |

OTHER REFERENCES

Hindersinn et al., Encyclopedia of Polymer Science and Technology Interscience, 7, 15, 21 (1967), TP156 P6 E6 (1967).

Lindemann, Industrial and Engineering Chemistry, 61, No. 5, p. 74, (May 1969).

Schmidt, Trans, J. Plastics Inst., Dec. 1965, pp. 248, 9.

ALLAN LIEBERMAN, Primary Examiner

T. DeBENEDICTIS, Sr., Assistant Examiner

U.S. Cl. X.R.

260—24 Digest, 41 B, 45.7 P, 45.9 R

PO-1050
(5/69)

UNITED STATES PATENT OFFICE
CERTIFICATE OF CORRECTION

Patent No. 3,635,866          Dated January 18, 1972

Inventor(s) Francis M. Seger

It is certified that error appears in the above-identified patent and that said Letters Patent are hereby corrected as shown below:

Column 2, line 44, change "X10$_3$" to --X10$^3$--

Column 2, line 46, change "X10$_3$" to --X10$^3$--

Signed and sealed this 30th day of May 1972.

(SEAL)
Attest:

EDWARD M. FLETCHER, JR.          ROBERT GOTTSCHALK
Attesting Officer          Commissioner of Patents